United States Patent [19]
Gibson

[11] Patent Number: 4,792,072
[45] Date of Patent: Dec. 20, 1988

[54] CYCLE SURFBOARD CARRIER

[75] Inventor: John E. Gibson, Seaforth, Australia

[73] Assignee: Kalmson Pty, Limited, Seaforth, Australia

[21] Appl. No.: 107,578

[22] Filed: Oct. 6, 1987

[51] Int. Cl.$^4$ .............................................. B62J 7/00
[52] U.S. Cl. .................................... 224/32 A; 224/39
[58] Field of Search ................ 224/30 R, 32 A, 32 R, 224/39, 917, 33 R, 33 A, 30 A, 40, 41, 31, 36, 38; 280/289 A

[56] References Cited

U.S. PATENT DOCUMENTS

| | | | |
|---|---|---|---|
| 670,503 | 3/1901 | Cowles | 224/40 |
| 3,338,484 | 8/1967 | Hall, Sr. | 224/41 |
| 3,827,613 | 8/1974 | Meyer | 224/32 A X |
| 4,296,878 | 10/1981 | Ward et al. | 224/32 A |
| 4,387,836 | 6/1983 | Laesch | 224/32 A |
| 4,393,986 | 7/1983 | Sirey | 224/32 A |
| 4,410,116 | 10/1983 | Mattei | 224/30 R X |

FOREIGN PATENT DOCUMENTS

| | | | |
|---|---|---|---|
| 330339 | of 1903 | France | 224/40 |
| 54001 | 3/1923 | Sweden | 224/40 |

Primary Examiner—Henry J. Recla
Assistant Examiner—Robert Petrik
Attorney, Agent, or Firm—Michael J. Striker

[57] ABSTRACT

A carrier to transport a surfboard of similarly shaped article on a bicycle. The carrier has a pair of elongate members hingedly joined to each other and crossing each other at a location along their lengths. One member has a first end attachable immediately beneath a seat of the bicycle. The other member has a second end attachable on an axle of the bicycle. The members have padded substantially V-shaped portions formed to receive an edge of a surfboard. The members each have another end to support resilient members for engaging around the surfboard when fitted on the carrier to hold the surfboard firmly in position in the padded portions so that the surfboard projects forwardly and upwardly relative to the bicycle and clear of a head of a rider when the rider is riding the bicycle.

7 Claims, 2 Drawing Sheets

CYCLE SURFBOARD CARRIER

The present invention relates to a cycle surfboard carrier that is to say to a carrier by means of which surfboards or similarly shaped articles may be carried on a bicycle.

The transport of surfboards presents difficulties in view of their size and shape and this is particularly so for persons whose only means of transport is a bicycle. The object of the present invention is to provide a simple and inexpensive article that may be attached to any bicycle and by means of which a surfboard may be transported on the bicycle safely without damage to the board and without interfering unduly with the rider.

The present invention consists in a carrier for the transport of a surfboard or similarly shaped article on a bicycle, the carrier consisting of a pair of elongated members hingedly joined at a point along their lengths, one end of one member being adapted for attachment to a bicycle at a point immediately beneath the seat thereof and the other member being adapted at one end for connection to the axle of the rear wheel of the bicycle, the members when so attached to a bicycle projecting rearwardly therefrom, each member having at its other end a padded substantially V-shaped portion adapted to receive a surfboard edge, each such other end of each member being adapted to support means for engagement around a surfboard when fitted on the carrier to hold the surfboard firmly in position in said padded portions with the surfboard projecting forwardly and upwardly, the upper end of said surfboard extending clear of the head of a rider of the bicycle.

In order that the nature of the invention may be better understood a preferred embodiment thereof is hereinafter described by way of example with reference to the accompanying drawings in which.

Figure 1:
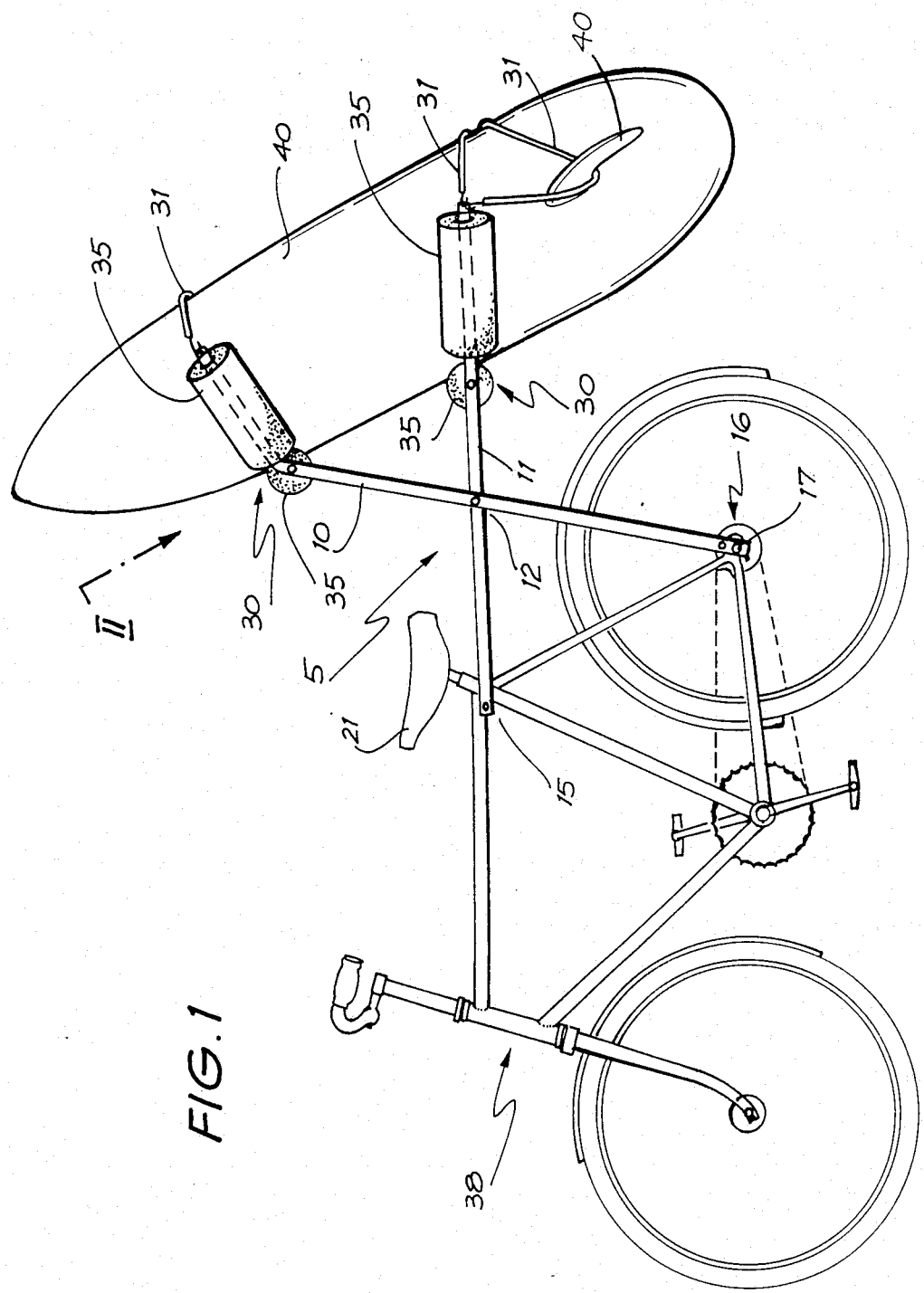
FIG. 1 is a elevation view or a carrier according to a preferred embodiment of the invention attached to a bicycle with a surfboard mounted therein.

In FIG. 1 it can be seen that the carrier 5 illustrated in the drawings consists of two elongated members 10 and 11 that are pivotally connected by a sleeved bolt 12. The members 10 and 11 are substantially identical in construction except in that one end 15 of the member 11 is adapted for connection to the bicycle 35 underneath the seat 21 thereof while one end 16 of the other member 10 is adapted for connection to the rear axle 17 of the bicycle. Although the following description relates to member 10, the description thereof applies equally to member 11 except where specifically indicated.

Figure 2:
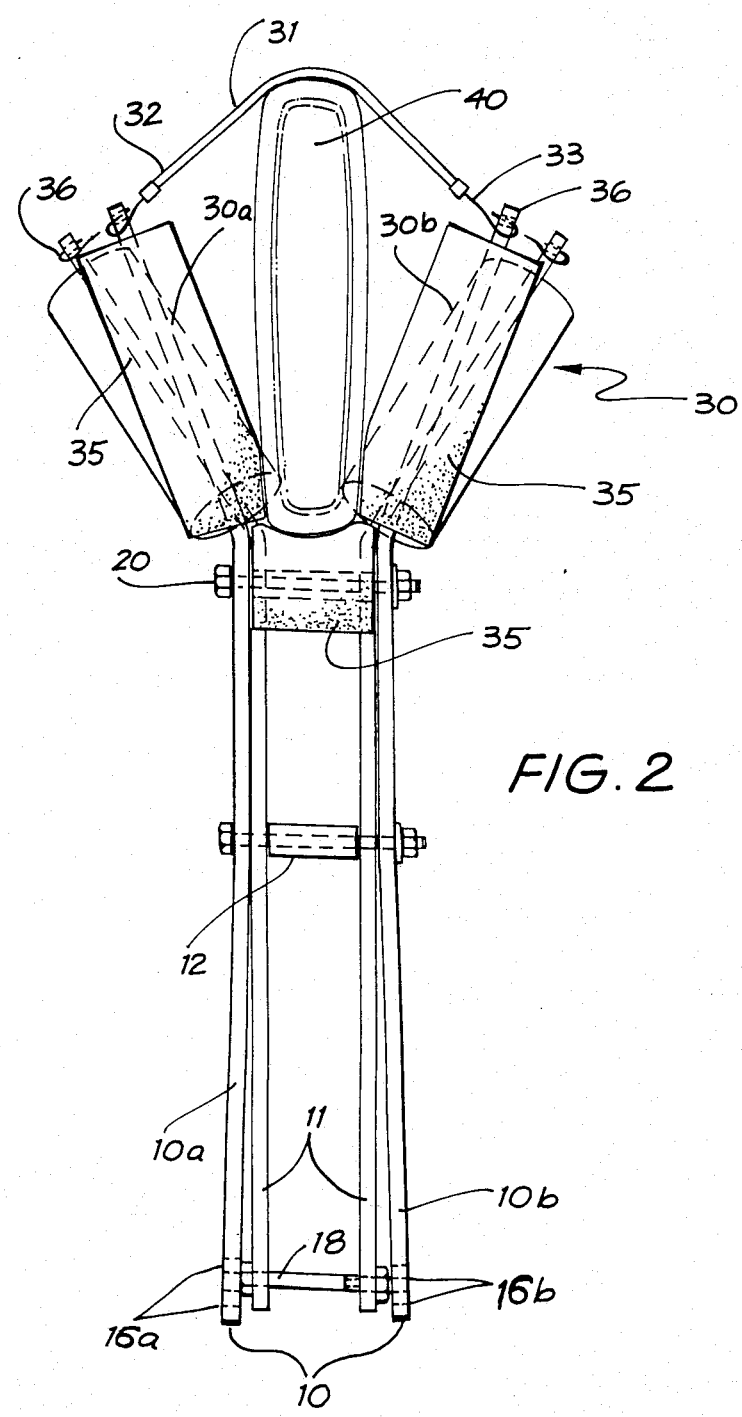
FIG. 2 is a view on the direction shown as 11 in FIG. 1 in which the bicycle has been deleted for clarity.

In the preferred embodiment illustrated in FIG. 2, an outer elongate member 10 is formed from two substantially parallel sub-members 10a, 10b which are separated at two points therealong by sleeved bolts 20, 12. The ends of sub-members 10a, 10b have holes 16a, 16b drilled therein to allow said ends to be bolted to the rear axle 17 of the bicycle 35. The corresponding and the other elongate member 11 includes a bolt 18 to facilitate connection to the seat clamp of the bicycle.

At the surfboard receiving end 30 of the elongate member 10, the ends 30a, 30b of sub-members 10a, 10a diverge to provide a V-shaped end to the elongate member 10. The extreme ends of the diverging parts 30a, 30a include holes 36 to allow connection thereto of a resilient restraining means 31. In the preferred embodiment, the resilient restraining means 31 further comprises an elastic cord 32 with wire hooks 33 attached to each end thereof. The resilient restraining means is attached to the ends 30a, 30b of sub-members 10a, 10b by engagement of the wire hooks 32 in the holes 36 in the ends thereof. The ends 30a, 30b of the sub-members 10a, 10b as well as the sleeved bolt 20 are enclosed in padding material 35.

When a surfboard 40 is placed in the V-shaped end 30 of the elongate member 10 and the resilient restraining means stretched therearound, the surfboard is firmly retained in position within the V-shaped end 30 of the elongated member 10. The surfboard can be partially supported by looping an elastic cord under the surfboard fin 40. The padding material 35 prevents concentrated loads acting on the surfboard and thereby prevents the surfboard from being damaged whilst being carried by the present invention.

Referring back to FIG. 1, it can be seen that member 10 and 11 of the present invention share a common sleeved bolts 12 about which the members are hingedly joined together. When removed from the bicycle the elongate members 10 and 11 can be moved relative o each other in a scissor-like motion to collapse the inventive carrier for storage.

The relative lengths of the elongate members 10 and 11 and the location of the hinged connection 12 can be selected on simple geometric principles such that when connected to the bicycle 32, the carrier 5 extends rearwardly of said bicycle and a surfboard firmly retained therein by the resilient restraining means 3,, 31 projects forwardly and upwardly, clear of the rider's head.

I claim:

1. A carrier to transport a surfboard or similarly shaped article on a bicycle, comprising;
   a pair of elongated members hingedly joined to each other and crossing each other at a location along their lengths, one of said members having an end attachable immediately beneath a seat of the bicycle and the other of said members having an end attachable to an axle of a rear wheel of the bicycle so that the members when so attached to the bicycle project rearwardly therefrom, each of said elongated members having a free end spaced distal from said location; and padded substantially V-shaped portions formed on said free ends so as to receive an edge of a surfboard, each of said free ends being formed to support resilient means for engaging around the surfboard when fitted on the carrier to hold the surfboard firmly in position in said padded portions, said V-shaped portions being arranged relative to each other so that when said elongated members are attached to the bicycle, the surfboard project forwardly and upwardly relative to the bicycle and an upper end of the surfboard extends clear of a head of a rider when the rider is riding the bicycle.

2. The carrier of claim 1, wherein each of said elongated members is composed of a pair of parallel sub-members, each pair of said sub-members diverging away from each other at a location distal from where said elongate members are attachable to the bicycle so as to define said substantially V-shaped portions of said elongate members.

3. The carrier of claim 2; and further comprising resilient means for engaging around the surfboard or the similarly shaped article and including an elastic with cord with wire hooks at each end thereof, said V- shaped portions having ends with holes into which are engaged said wire hooks.

4. A carrier for transporting a surfboard or similarly shaped article on a bicycle, comprising:
- a first elongated member being attachable to an axle of a rear wheel of the bicycle;
- a second elongated member being attachable immediately beneath a seat of the bicycle, said elongated members crossing each other at a location;
- means for hingedly joining said elongated members to each other at said location, each of said elongated members having free end portions extending outward away from said hingedly joining means, said free end portions of each of said elongated members diverging apart from each other so as to form substantially V-shaped formations; and
- means for cushioning the surfboard between said V-shaped formations, said cushioning means including padding on all of said free end portions, said free end portions being formed to support means for resiliently engaging around the surfboard to retain the surfboard against said padding, said V-shaped formations being arranged relative to each other so that when the surfboard is in position between said V-shaped formations, the surfboard projects forwardly and upwardly relative to the bicycle and an upper end of the surfboard projects clear of a head of a rider when the rider is riding the bicycle.

5. The carrier of claim 4, wherein each of said elongated members is composed of a pair of sub-members parallel to each other, each pair of said sub-members diverging away from each other at a location distal from said hingedly joining means so as to define said substantially V-shaped formations.

6. The carrier of claim 4, and further comprising the resilient means.

7. The carrier of claim 6, wherein said resilient means includes an elastic cord with ends and a wire hook at each of said ends of said elastic cord, said V-shaped formations having ends with hole into which are engaged said wire hooks.

* * * * *